US010411612B2

(12) United States Patent
Oonishi et al.

(10) Patent No.: US 10,411,612 B2
(45) Date of Patent: Sep. 10, 2019

(54) POWER GENERATION SYSTEM FOR SELF ACTIVATION

(71) Applicant: KABUSHIKI KAISHA TOSHIBA, Tokyo (JP)

(72) Inventors: Atsuro Oonishi, Tokyo (JP); Hiroshi Takahashi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/699,629

(22) Filed: Sep. 8, 2017

(65) Prior Publication Data

US 2018/0278170 A1 Sep. 27, 2018

(30) Foreign Application Priority Data

Mar. 21, 2017 (JP) ................................ 2017-054574

(51) Int. Cl.
*H02M 5/45* (2006.01)
*H02M 5/44* (2006.01)
*H02J 50/00* (2016.01)
*H02K 35/00* (2006.01)
*H02M 1/00* (2006.01)

(52) U.S. Cl.
CPC ............... *H02M 5/44* (2013.01); *H02J 50/00* (2016.02); *H02K 35/00* (2013.01); *H02M 5/45* (2013.01); *H02M 2001/0003* (2013.01)

(58) Field of Classification Search
None
See application file for complete search history.

(56) References Cited

U.S. PATENT DOCUMENTS

| | | | | |
|---|---|---|---|---|
| 8,933,611 B2 | 1/2015 | Nakatsuka et al. | | |
| 2003/0123203 A1* | 7/2003 | Telefus | H02H 9/005 361/58 |
| 2004/0078662 A1 | 4/2004 | Hamel et al. | |
| 2004/0160792 A1* | 8/2004 | Youm | H02M 1/32 363/37 |

(Continued)

FOREIGN PATENT DOCUMENTS

| | | |
|---|---|---|
| JP | 2003-133971 | 5/2003 |
| JP | 2005-253166 | 9/2005 |

(Continued)

OTHER PUBLICATIONS

Extended European Search Report, dated Apr. 23, 2018, Application No./Patent No. 17190096.2-1202.

*Primary Examiner* — Jeffrey A Gblende
(74) *Attorney, Agent, or Firm* — Finnegan, Henderson, Farabow, Garrett & Dunner, L.L.P.

(57) ABSTRACT

A power generation system in an embodiment includes a power generator, a rectifying and smoothing circuit, a converter, a voltage measurement unit, and a switch. The power generator outputs AC power. The rectifying and smoothing circuit converts the AC power to DC power and smooths the DC power. The voltage measurement unit measures an average voltage of the AC power or a voltage of the smoothed DC power. The converter transforms the smoothed DC power. The switch is disposed between the rectifying and smoothing circuit and the converter, and becomes an ON state when the measured voltage becomes a reference voltage or higher.

6 Claims, 13 Drawing Sheets

(56) References Cited

U.S. PATENT DOCUMENTS

| | | | | |
|---|---|---|---|---|
| 2004/0251789 | A1 | 12/2004 | Sakai | |
| 2011/0115222 | A1 | 5/2011 | Parker et al. | |
| 2011/0215646 | A1* | 9/2011 | Morishima | H02J 9/00 307/66 |
| 2013/0139155 | A1 | 5/2013 | Shah | |
| 2016/0276915 | A1 | 9/2016 | Oonish et al. | |
| 2017/0070158 | A1* | 3/2017 | Kato | H02M 7/08 |

FOREIGN PATENT DOCUMENTS

| | | |
|---|---|---|
| JP | 5917405 | 5/2016 |
| JP | 2016-178621 | 10/2016 |
| WO | WO 2003/025969 A1 | 3/2003 |

* cited by examiner

POWER GENERATION SYSTEM FOR SELF ACTIVATION

CROSS-REFERENCE TO RELATED APPLICATION

This application is based upon and claims the benefit of priority from Japanese Patent Application No. 2017-054574, filed on Mar. 21, 2017; the entire contents of which are incorporated herein by reference.

FIELD

Embodiments described herein generally relate to a power generation system.

BACKGROUND

A vibration power generator generates power utilizing environmental vibration (for example, vibration of vehicles and trains, or vibration of rain pelting on the ground). The power generated by the vibration power generator is expected as an alternative to the power supply (battery or the like) for use in a sensor or the like.

However, appropriate activation of a system including the vibration power generator is not always easy.

DETAILED DESCRIPTION

Figure 1:
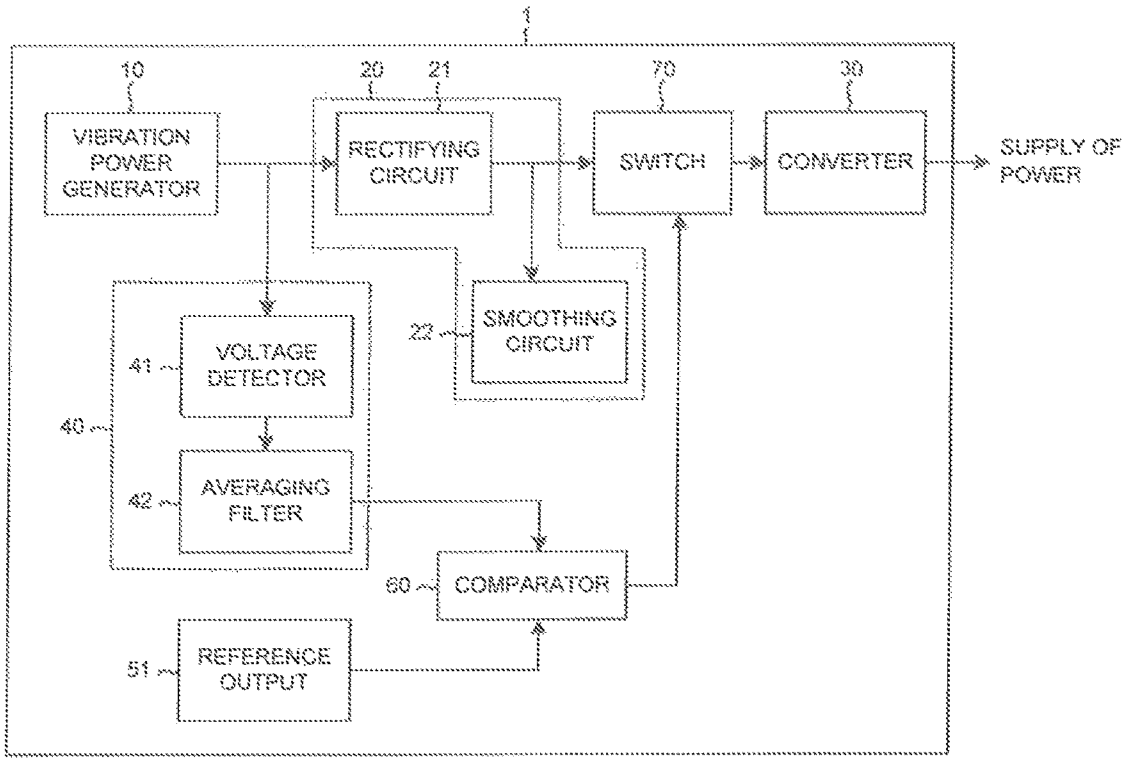
FIG. 1 is a functional block diagram of a vibration power generation system 1 in a first embodiment.

A power generation system in this embodiment includes a power generator, a rectifying and smoothing circuit, a converter, a voltage measurement unit, and a switch. The power generator outputs AC power. The rectifying and smoothing circuit converts the AC power to DC power and smooths the DC power. The voltage measurement unit measures an average voltage of the AC power or a voltage of the smoothed DC power. The converter transforms the smoothed DC power. The switch is disposed between the rectifying and smoothing circuit and the converter, and becomes an ON state when the measured voltage becomes a reference voltage or higher.

Hereinafter, a vibration power generation system in an embodiment will be explained referring to the drawings. Components with the same appended reference signs indicate the same components. Note that the drawings are schematic or conceptual.

(First Embodiment)

A first embodiment will be explained. FIG. 1 is a functional block diagram of a vibration power generation system 1 in a first embodiment.

The vibration power generation system 1 includes a vibration power generator 10, a rectifying and smoothing circuit 20, a converter 30, a voltage measurement unit 40, a reference output 51, a comparator 60, and a switch 70.

Figure 2:
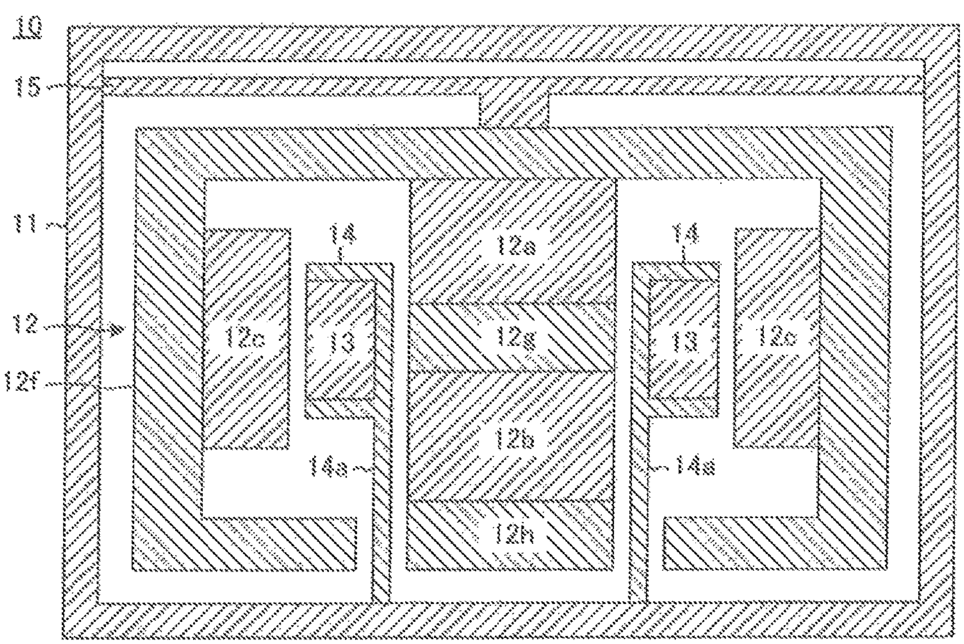
FIG. 2 is a cross-sectional view illustrating an example of a vibration power generator 10.

FIG. 2 is a cross-sectional view illustrating an example of the vibration power generator 10. The vibration power generator 10 converts energy of vibration (mechanical energy) to AC power and outputs it. The vibration power generator 10 includes a case 11, a vibrator 12, a coil 13, a coil fixing member 14, an elastic member 15.

The vibrator 12 is fixed to the elastic member 15 and suspended in the case 11. The vibrator 12 has magnets 12*a* to 12*c* and yokes 12*f* to 12*h*.

The yoke 12*f* is in an almost hollow columnar shape and surrounds the magnets 12*a* to 12*c* and the yokes 12*g*, 12*h*. An upper middle portion of the yoke 12*f* is connected to the elastic member 15.

The magnet 12*a*, the yoke 12*g*, the magnet 12*b*, and the yoke 12*h* are disposed in sequence along a center axis of the yoke 12*f* on an inner upper surface of the yoke 12*f*.

Each of the magnet 12*a* and the magnet 12*b* has an N pole on the yoke 12*g* side. As a result of this, magnetic fluxes repelling each other are generated from the magnets 12*a*, 12*b*.

The magnet 12*c* is, for example, in a cylindrical shape, and is disposed on an inner side surface of the yoke 12*f* with a space interposed with respect to the outside of the coil 13. The magnet 12*c* has an S pole facing the coil 13 and an N pole in contact with the inner side surface of the yoke 12*f*.

The coil 13 is in a ring shape, and is disposed on the outside of the magnets 12*a*, and 12*b* and on the inside of the magnet 12*c*. The coil 13 is wound in a circumferential direction, and its center axis is coincident with the center axis of the vibrator 12 (the case 11).

The coil fixing member 14 fixes the coil 13 in the vibrator 12. The coil fixing member 14 has a columnar coil support 14*a* fixed to a bottom surface of the case 11. The coil fixing member 14 is fixed to the case 11 by the coil support 14*a* but not fixed to the vibrator 12 (the magnets 12*a* to 12*c* and the yokes 12*g*, 12*h*).

The elastic member 15 is in a disk shape, and has a side surface fixed to the inner side surface of the case 11 and a lower surface partially connected to the vibrator 12.

When external vibration is applied to the vibration power generator 10, the coil 13 vibrates integrally with the case 11. The vibrator 12 vibrates with a predetermined frequency with respect to the coil 13 according to the elastic force of the elastic member 15. As a result of this, the vibrator 12 performs relative motion in the axial direction with respect to the coil 13. Temporal change of the magnetic fluxes interlinking the coil 13 generates electromotive force.

The external vibration (mechanical energy) applied to the vibration power generator 10 is converted to AC power as described above. The vibration power generator 10 converts vibration (motion in the longitudinal direction in the drawing) directly to AC power here, but may convert vibration to AC power after converting vibration to rotational motion.

Note that the vibration power generator 10 may be replaced with generators in general (for converting mechanical energies in general to AC power) in this embodiment.

The rectifying and smoothing circuit 20 converts the AC power outputted from the vibration power generator 10 to smoothed DC power. The rectifying and smoothing circuit 20 has a rectifier circuit 21 and a smoothing circuit 22.

The rectifier circuit 21 converts the AC power outputted from the vibration power generator 10 to DC power (typically, pulsating current). The rectifier circuit 21 can be composed of one or a plurality of diodes. For example, a full-wave rectifier in which four diodes are bridge-connected can be used as the rectifier circuit 21.

The smoothing circuit 22 smooths the DC power (pulsating current) outputted from the rectifier circuit 21. The smoothing circuit 22 can be composed of one or a plurality of capacitors, or a combination of a capacitor and a coil. The smoothing circuit 22 temporarily stores current (pulsating current) as electric charges, and discharges the electric charges to thereby smooth the voltage. In short, the smoothing circuit 22 is a kind of a power storage circuit that stores power.

The voltage measurement unit 40, the reference output 51, the comparator 60, the switch 70, and the converter 30 operate by the smoothed voltage outputted from the rectifying and smoothing circuit 20. Therefore, the vibration power generation system 1 does not need battery or the like. This point also applies to other embodiments.

The converter 30 is, for example, a DC-DC converter, and transforms the DC power smoothed by the smoothing circuit 22 into a desired voltage. For example, the converter 30 converts the DC power to AC and transforms the AC power by a transformer or the like, and then returns the AC power to DC. The power outputted from the converter 30 (the vibration power generation system 1) is supplied to an appropriate apparatus such as a sensor.

The voltage measurement unit 40 measures and outputs an average value (average voltage Va) of the output voltage outputted from the vibration power generator 10. The average value is, as an example, a root mean square (RMS, effective value) of the voltage. The voltage measurement unit 40 may measure an envelope or the like in place of the average value of the output voltage. The voltage measurement unit 40 may output the voltage itself (hardware output), or may output a signal indicating the voltage value (software output).

The voltage measurement unit 40 has a voltage detector 41 and an averaging filter 42.

The voltage detector 41 detects the AC voltage outputted from the vibration power generator 10. More specifically, the voltage detector 41 outputs the voltage itself of the AC power outputted from the vibration power generator 10 or a signal indicating its voltage value.

The averaging filter 42 averages the AC voltage outputted from the voltage detector 41 to find the average value (average voltage Va). This averaging may be realized by either hardware or software.

The reference output 51 sets (stores) and outputs a reference voltage Vr. The reference output 51 may output either the voltage itself or a signal indicating its voltage value similarly to the voltage measurement unit 40. As will be explained later, the reference voltage Vr is, for example, an average value of the output voltage corresponding to the time when the vibration power generator 10 is at die maximum output (when a load connected thereto is at an appropriate impedance).

The comparator 60 compares the average voltage Va measured by the voltage measurement unit 40 and the reference voltage Vr of the reference output 51, and outputs an output signal when the average voltage Va becomes the reference voltage Vr or higher.

The switch 70 is disposed between the rectifying and smoothing circuit 20 and the converter 30, and tarns ON/OFF the connection between them. At the activation time of the vibration power generation system 1, the switch 70 is in an OFF state, and becomes an ON state upon reception of the output signal from the comparator 60. More specifically, at the activation time of the vibration power generation system 1, the smoothed DC voltage from the rectifying and smoothing circuit 20 is not applied to the converter 30, but the smoothed DC voltage is applied to the converter 30 by output of the signal from the comparator 60.

Figure 3:
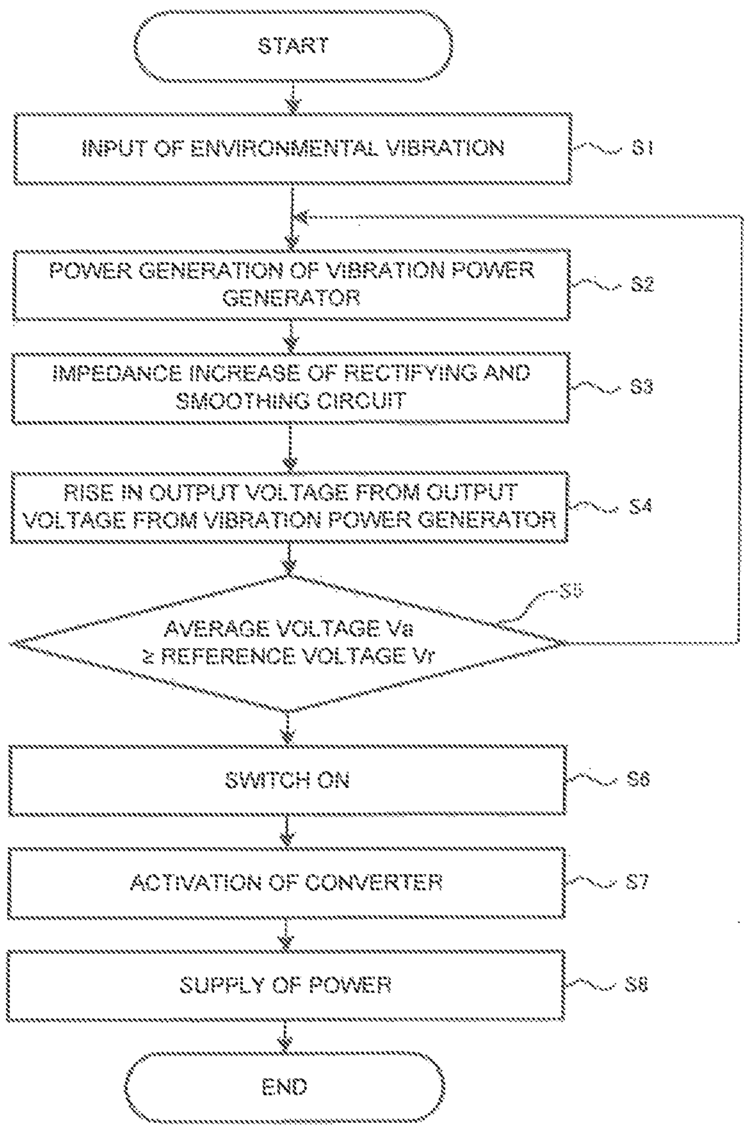
FIG. 3 is a flowchart illustrating an operation procedure of the vibration power generation system 1 in the first embodiment.

As illustrated in FIG. 3, the vibration power generator 10 receives environmental vibration and thereby generates power (Steps S1, S2), activating the vibration power generation system 1.

For this activation, an activation switch or the like is not always needed. First, a switch (activation switch) is disposed between the vibration power generator 10 and the rectifying and smoothing circuit 20 and fee switch is turned ON, thereby enabling activation of the vibration power generation system 1. On the other hand, even without such an activation switch, it can be considered that the vibration power generation system 1 is activated when vibration is applied to the vibration power generation system 1. That is the time when the vibration power generation system 1 is installed under environmental vibration, or the time when vibration stops for a certain period after the installation and then vibration restarts.

When the vibration power generator 10 starts generating power, the impedance of the rectifying and smoothing circuit 20 increases (Step S3). Since the power is stored in the smoothing circuit (power storage circuit) 22 via the rectifier circuit 21, the impedance of the smoothing circuit 22 increases. As a result of this, an impedance Z of the whole rectifying and smoothing circuit 20 also increases.

On the other hand, the output voltage from the vibration power generator 10 gradually rises from the activation time (Step S4). When the average value (average voltage Va) of the output voltage becomes the reference voltage Vr or higher, the switch 70 becomes the ON state (Steps S5, S6). As a result of this, the converter 30 is activated to start power supply to an external load such as a sensor (Steps S7, S8).

Note that, as will be explained later, the condition at Step S5 "the average voltage Va becoming the reference voltage Vr or higher" is equivalent to "the impedance Z of the rectifying and smoothing circuit 20 becoming an appropriate impedance Zr or higher".

When the average voltage Va becomes the reference voltage Vr or higher at the activation time of the vibration power generation system 1 as described above, the switch 70 is turned ON to supply power from the vibration power generator 10 to the converter 30. This results in facilitation of appropriate activation of the vibration power generation system 1 as described in the following.

Figure 4:
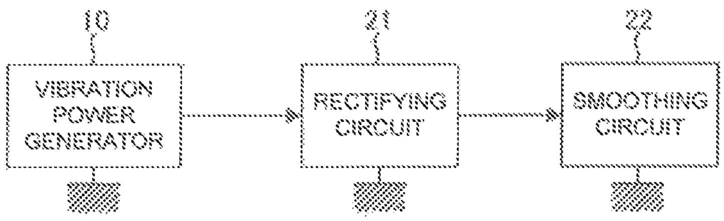
FIG. 4 is a circuit diagram illustrating a state of the vibration power generation system 1 at activation time.

FIG. 4 illustrates the connection state of the vibration power generator 10, the rectifier circuit 21, and the smoothing circuit 22 at the time when the switch 70 is OFF in the functional block diagram in FIG. 1. More specifically, the vibration power generator 10, the rectifier circuit 21, and the smoothing circuit (power storage circuit) 22 are connected in series.

Figure 5A:
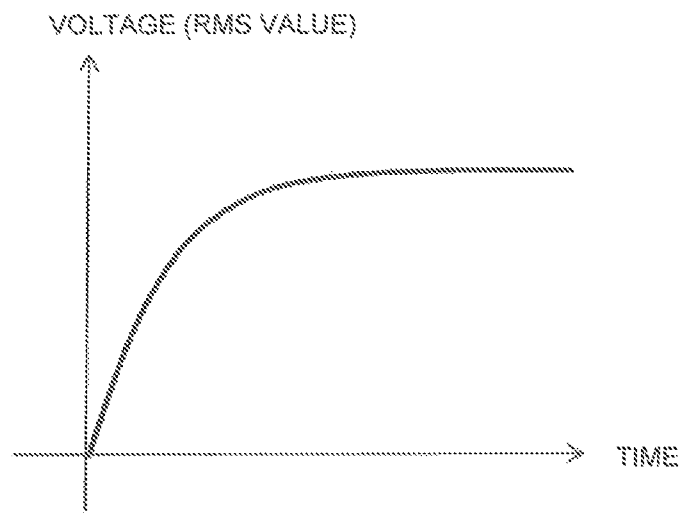
FIG. 5A is a graph illustrating temporal transition of a voltage at the activation time.
Figure 5B:
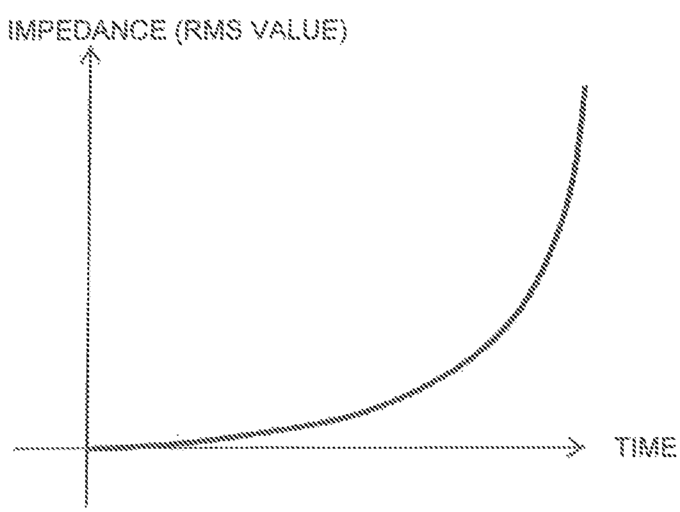
FIG. 5B is a graph illustrating temporal transition of a load impedance at the activation time.
Figure 6:
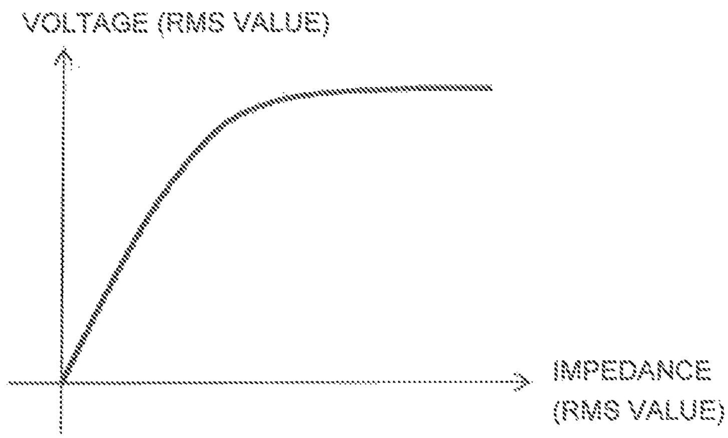
FIG. 6 is a graph illustrating a correspondence between impedance and voltage at the activation time.

In this case, temporal transitions of the output voltage (average voltage Va) from the vibration power generator 10, the impedance Z (total of impedances of the rectifier circuit 21 and the smoothing circuit 22) of the rectifying and smoothing circuit 20 connected to the vibration power generator 10 are as in graphs of FIG. 5A, FIG. 5B respectively. Further, as illustrated in FIG. 6, the impedance and the output voltage (average voltage) correspond in a one-to-one relationship.

Note that the impedance is obtained from the average voltage and average current as will be described later, and therefore can be considered as a kind of average value (RMS value).

The power generator including the vibration power generator 10 generally changes in output power depending on the impedance of a load. To maximize the output power, it is preferable to set the impedance of the load to an appropriate value (hereinafter, referred to as an "appropriate impedance Zr").

However, when an electric circuit connected to the vibration power generator includes the smoothing circuit (power storage circuit), the impedance greatly changes while the smoothing circuit is charged. As a result, vibration power generator 10 cannot generate power efficiently.

Figure 7:
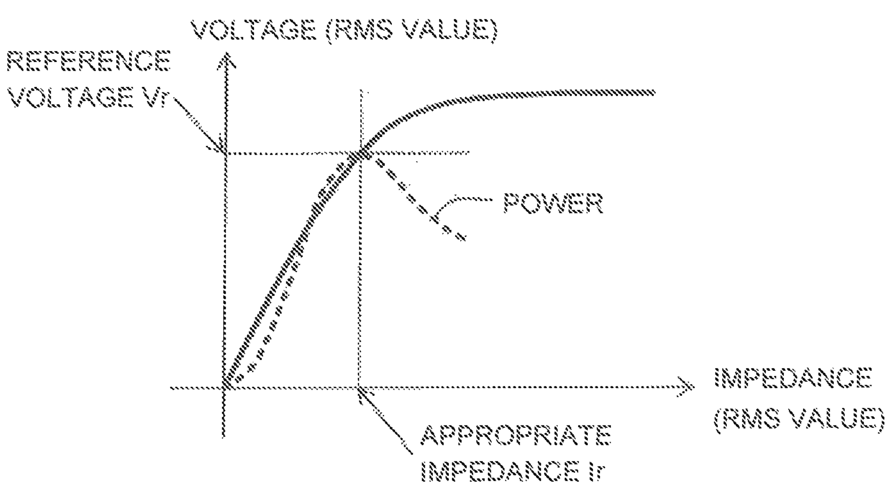
FIG. 7 is a graph illustrating a correspondence between appropriate impedance and reference voltage.

FIG. 7 is a graph made by overlapping the appropriate impedance Zr and the power from the vibration power generator 10 on FIG. 6. The average voltage corresponding to the appropriate impedance Zr is the reference voltage Vr, and the power from the vibration power generator 10 becomes maximum at this time. Therefore, the condition at Step S5 in the flowchart in FIG. 3 "the average voltage Va becoming the reference voltage Vr or higher" is equivalent to "the impedance Z of the rectifying and smoothing circuit 20 becoming the appropriate impedance Zr or higher".

By turning on the switch 70 at the point in time when the impedance Z of the rectifying and smoothing circuit 20 reaches the appropriate impedance Zr, the converter 30 can be activated at a power generation maximum point. This enables efficient and stable supply from the point in time when starting the supply of power from the vibration power generation system 1. If the switch 70 is not provided and the rectifying and smoothing circuit 20 and the converter 30 are directly connected, the operation of the converter 30 and the supply of power may become unstable or the power generation in the vibration power generator 10 may become inefficient.

Note that the reference voltage Vr can be experimentally obtained. Besides, when the appropriate impedance Zr is known, the reference voltage Vr can be calculated from the correspondence between the impedance Z and the average voltage Va.

(Second Embodiment)

Figure 8:
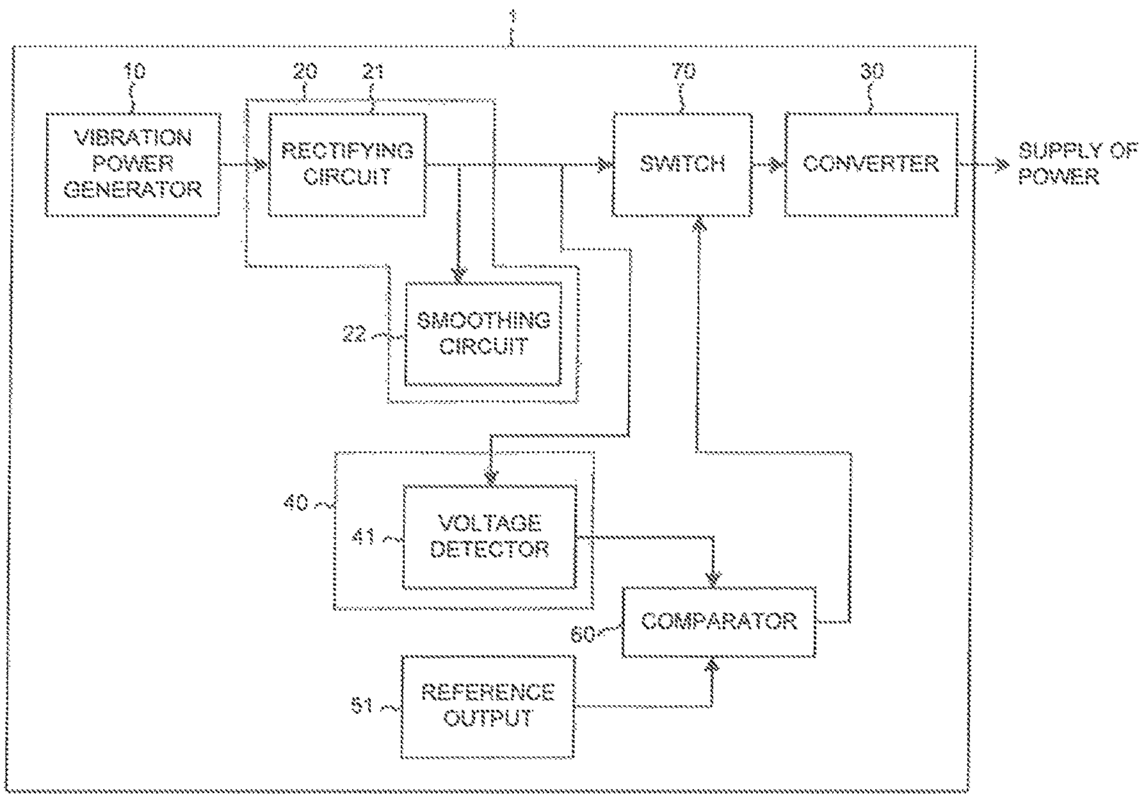
FIG. 8 is a functional block diagram of a vibration power generation system 1 in a second embodiment.

A second embodiment will be explained. FIG. 8 is a functional block diagram of a vibration power generation system 1 in the second embodiment.

As illustrated in FIG. 8, this embodiment is different from the first embodiment in that a voltage measurement unit 40 (a voltage detector 41) measures (detects) the voltage outputted from a rectifying and smoothing circuit 20. The other configuration is the same as that in the first embodiment.

The voltage detector 41 detects the smoothed voltage (DC) outputted from the rectifying and smoothing circuit 20, thus eliminating the need for the averaging filter. This makes it possible to simplify the configuration and reduce the power consumption.

(Third Embodiment)

Figure 9:
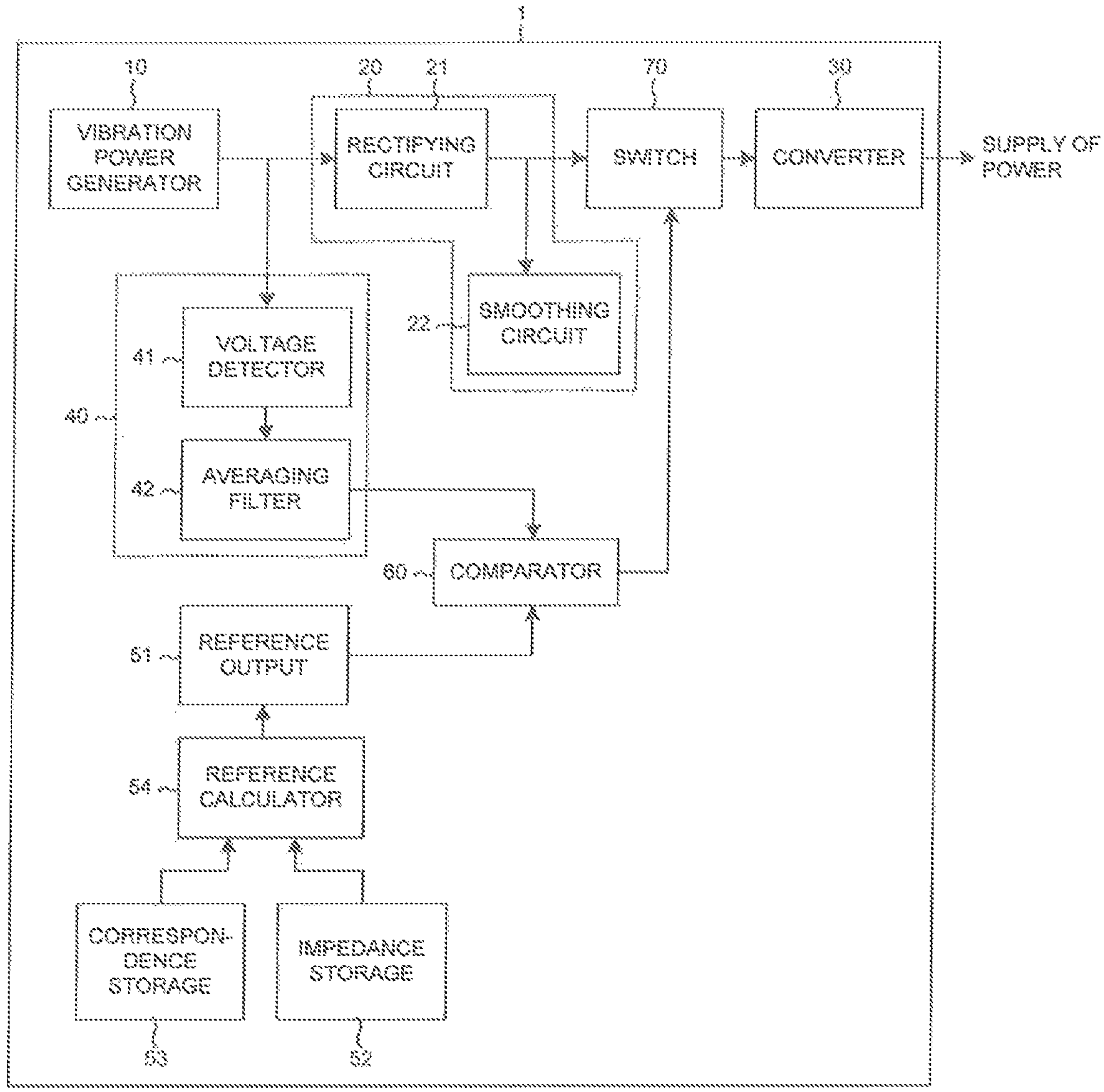
FIG. 9 is a functional block diagram of a vibration power generation system 1 in a third embodiment.

A third embodiment will be explained. FIG. 9 is a functional block diagram of a vibration power generation system 1 in the third embodiment.

The third embodiment is different from the first embodiment in that an impedance storage (setting unit) 52, a correspondence storage 53, and a reference calculator 54 are further provided. The other configuration is the same as that in the first embodiment.

The impedance storage 52 sets (stores) impedance as a reference (hereinafter, reference impedance Zr). For example, the impedance is set by software. The reference impedance Zr to be set is preferably the appropriate impedance.

The correspondence storage 53 stores the correspondence between the impedance and the average voltage as illustrated in FIG. 7.

The correspondence between the impedance and the average voltage may be a data base or a statistical model or a mathematical model. Note that the statistical model or the mathematical model does not need to be precise but may be expressed in an average or approximate manner.

The reference calculator 54 calculates the reference voltage Vr from the reference impedance Zr set by the impedance storage 52 and the correspondence between the impedance and the average voltage supplied from the correspondence storage 53.

According to this embodiment, the reference voltage Vr corresponding to the reference impedance Zr is uniquely calculated, and power can be taken out with high efficiency.

(Fourth Embodiment)

Figure 10:
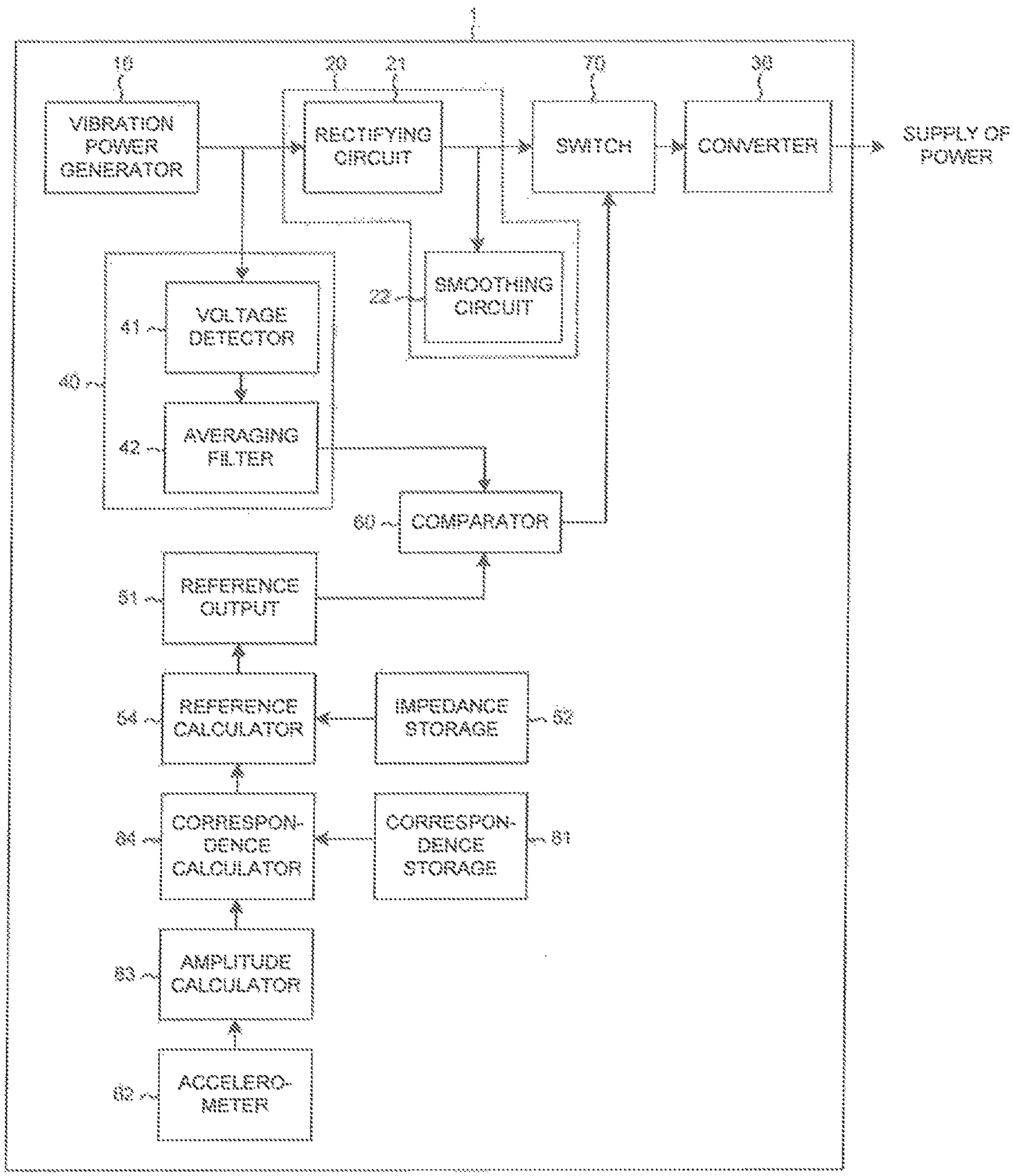
FIG. 10 is a functional block diagram of a vibration power generation system 1 in a fourth embodiment
Figure 11:
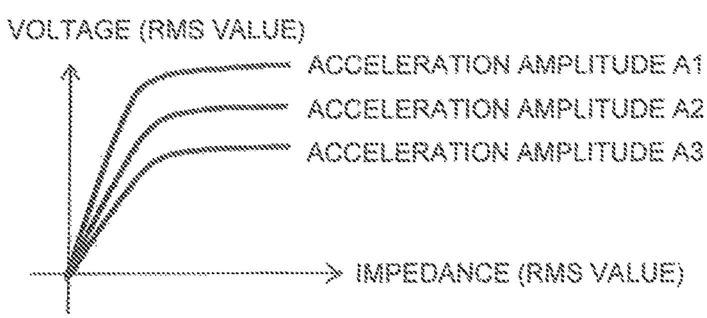
FIG. 11 is a graph illustrating an example of a correspondence among acceleration amplitude, impedance, and voltage.

A fourth embodiment will be explained. FIG. 10 is a functional block diagram of a vibration power generation system 1 in the fourth embodiment. FIG. 11 is a graph illustrating an example of the correspondence among acceleration amplitude, impedance, and voltage.

As illustrated in FIG. 10, the fourth embodiment is different from the third embodiment in that a correspondence storage 81, an accelerometer 82, an amplitude calculator 83, and a correspondence calculator 84 are provided in place of the correspondence storage 53. The other configuration is the same as that in the third embodiment.

The correspondence storage 81 stores die correspondence among an acceleration amplitude A, a impedance Z, and an average voltage Va as illustrated in FIG. 11. Though the correspondence between the impedance Z and the average voltage Va when the acceleration amplitude A is defined is illustrated here, the correspondence among the acceleration amplitude A, the impedance Z, and the average voltage Va only needs to be illustrated in any form.

When the environmental vibration is stationary and periodic like a sine wave, the correspondence between the impedance Z and the average voltage Va changes according to the acceleration amplitude A of the environmental vibration.

This correspondence may be a data base or a statistical model or a mathematical model. Note that the statistical model or the mathematical model does not need to be precise but may be expressed in an average or approximate manner.

The accelerometer 82 is a measuring device that measures the acceleration of environmental vibration.

The amplitude calculator 83 calculates the amplitude (average amplitude) A of the measured acceleration.

The correspondence calculator 84 finds the correspondence between the impedance Z and the average voltage Va at the measured acceleration amplitude A on the basis of the acceleration amplitude A outputted from the amplitude calculator 83 and the correspondence stored in the correspondence storage 81.

According to this embodiment, power can be taken out with high efficiency even when the correspondence between the impedance Z and the average voltage Va changes according to the amplitude A of the environmental vibration.

(Fifth Embodiment)

Figure 12:
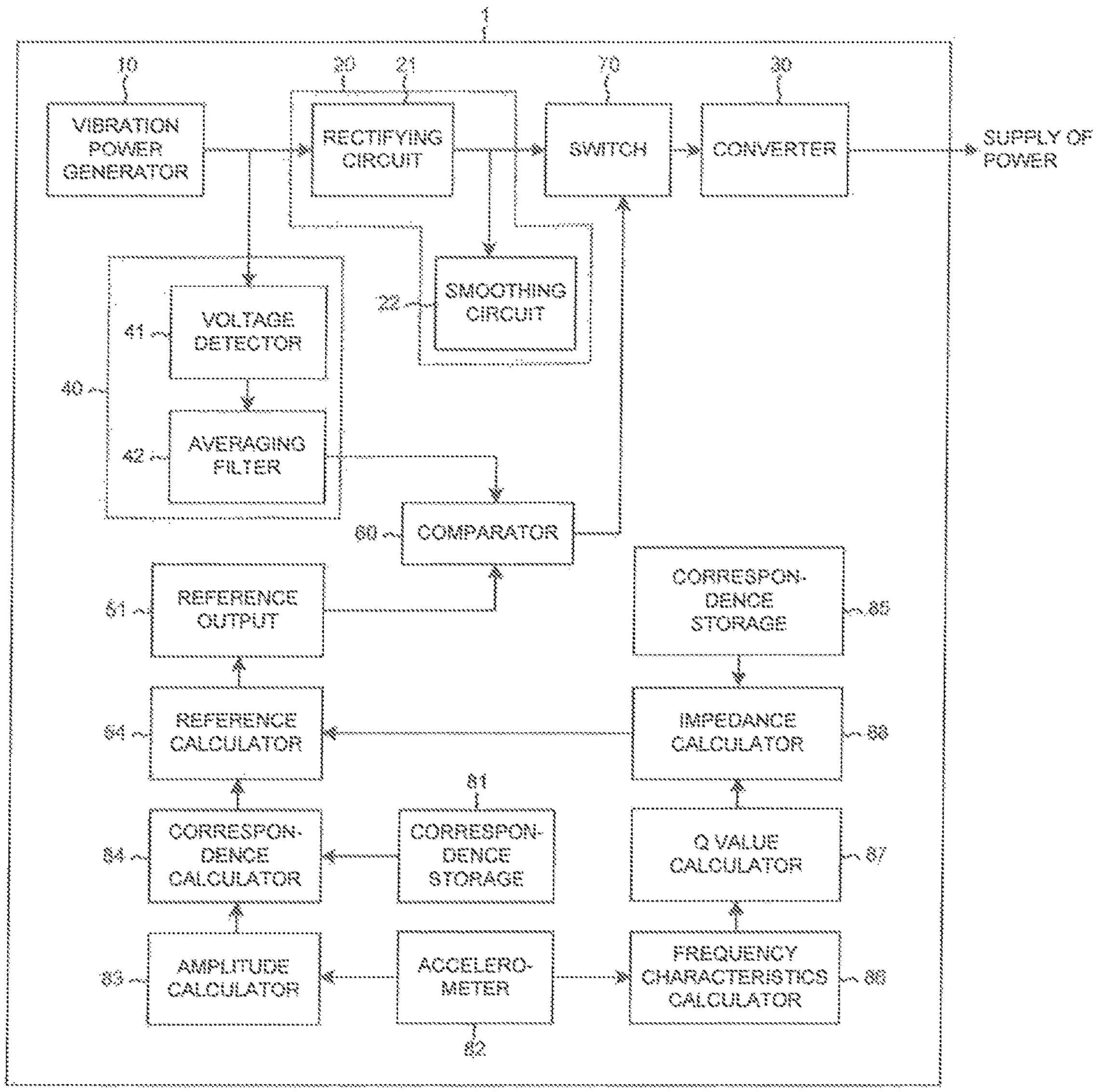
FIG. 12 is a functional block diagram of a vibration power generation system 1 in a fifth embodiment.
Figure 13:
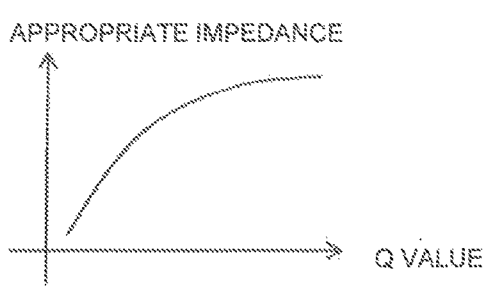
FIG. 13 is a graph illustrating an example of a correspondence between Q value of acceleration frequency characteristics and appropriate impedance.

A fifth embodiment will be explained referring to FIG. 12, FIG. 13. FIG. 12 is a functional block diagram of a vibration power generation system 1 in the fifth embodiment. FIG. 13 is a graph illustrating the correspondence between a Q value of frequency characteristics of acceleration and appropriate impedance.

As illustrated in FIG. 12, this embodiment is different from the fourth embodiment in that a correspondence storage 85, a frequency characteristics calculator 86, a Q value calculator 87, and an impedance calculator 88 are provided in place of the impedance storage 52. The other configuration is the same as that in the fourth embodiment.

The correspondence storage 85 stores the correspondence between the Q value of the frequency characteristics of the acceleration and the appropriate impedance (reference impedance) Zr. In other words, the appropriate impedance of the vibration power generator 10 changes by the Q value of the frequency characteristics of the acceleration.

The correspondence between the Q value of the frequency characteristics of the acceleration and the appropriate impedance may be a data base or a statistical model or a mathematical model. Note that the statistical model or the mathematical model does not need to be precise but may be expressed in an average or approximate manner.

The frequency characteristics of die acceleration mean the frequency distribution of the acceleration amplitude. Generally, the environmental vibration is not stationary and periodic like a sine wave, but typically includes various frequency components. Therefore, the distribution of the frequency component of the acceleration amplitude affects the operation of the vibration power generator 10.

The Q value of the frequency characteristics of the acceleration is a dimensionless number expressing a state of vibration and is defined as in following Expression (1)

$$Q=f_0/\Delta f \qquad \text{Expression (1)}$$

Here, $f_0$ is the frequency when the acceleration amplitude is at the peak, and $\Delta f$ is the frequency amplitude in the acceleration amplitude decreased by 3 dB from the peak value.

The frequency characteristics calculator 86 outputs the frequency characteristics of the acceleration (frequency distribution of the acceleration amplitude). In other words, the correspondence between the frequency and the acceleration amplitude is found.

The Q value calculator 87 finds the frequency $f_0$ and the frequency amplitude $\Delta f$ from the frequency characteristics of the acceleration, and further calculates the Q value of the frequency characteristics of the acceleration on the basis of Expression (1).

The impedance calculator 88 calculates the impedance at the Q value on the basis of the Q value of the acceleration frequency characteristics and the correspondence stored in the correspondence storage 85.

According to this embodiment, power can be taken out with high efficiency even when the appropriate impedance changes according to the Q value of the acceleration frequency characteristics of environmental vibration.

(Sixth Embodiment)

Figure 14:
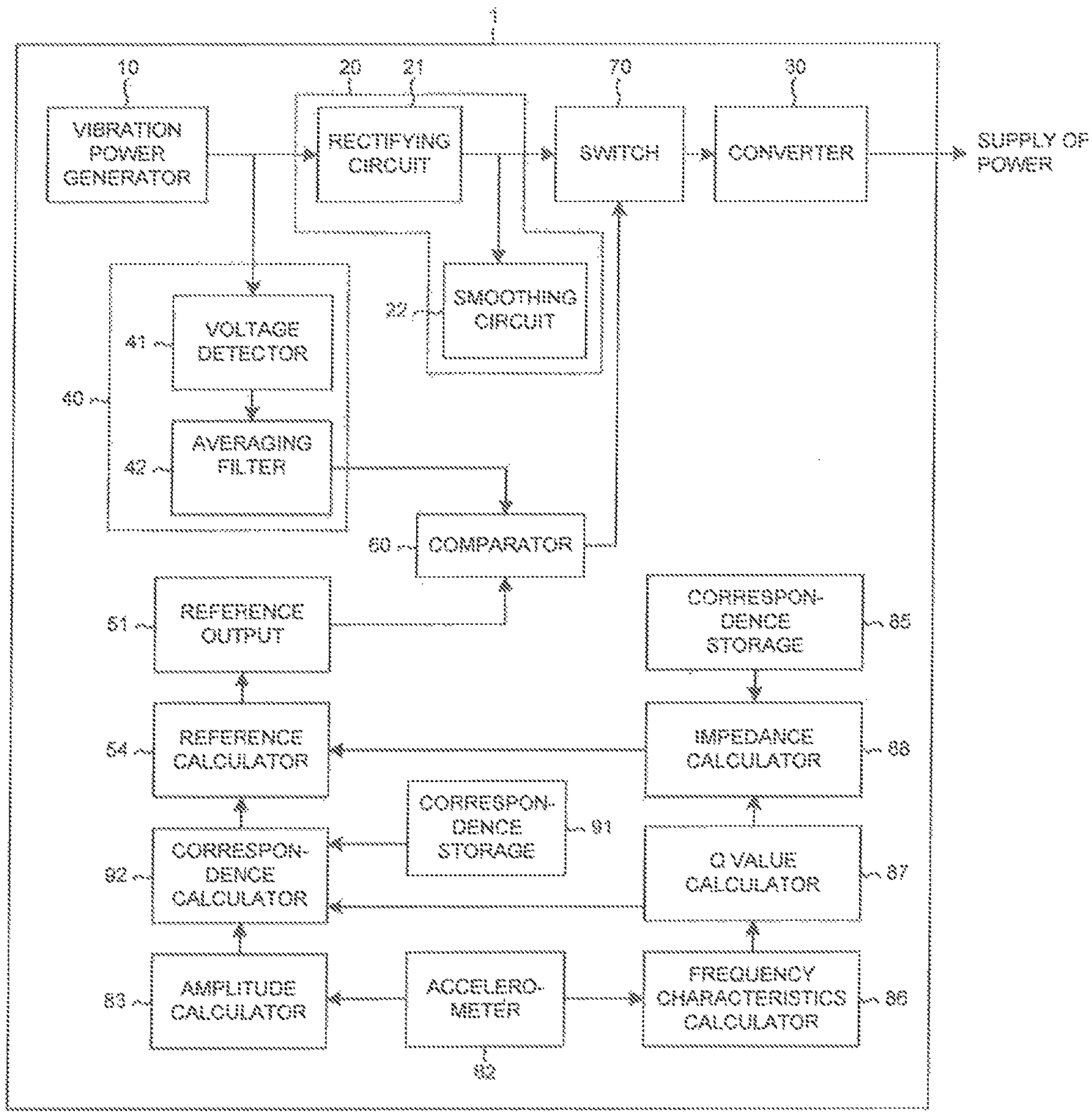
FIG. 14 is a functional block diagram of a vibration power generation system 1 in a sixth embodiment.
Figure 15:
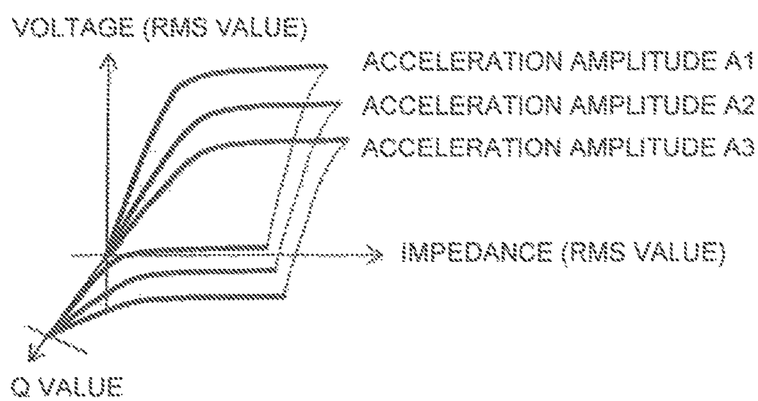
FIG. 15 is a graph illustrating an example of a correspondence among acceleration amplitude, Q value, impedance, and voltage.

A sixth embodiment will be explained referring to FIG. 14, FIG. 15. FIG. 14 is a functional block diagram of a vibration power generation system 1 in the sixth embodiment. FIG. 15 is a graph illustrating the correspondence among an acceleration amplitude A, a Q value of frequency characteristics of acceleration, an impedance Z, and an average voltage Va.

As illustrated in FIG. 14, this embodiment is different from the fifth embodiment in that a correspondence storage 91 and a correspondence calculator 92 are provided in place of the correspondence storage 81 and the correspondence calculator 84 and the Q value is inputted into the correspondence calculator 92. The other configuration is the same as that in the fifth embodiment.

The correspondence storage 91 stores the correspondence among the acceleration amplitude A, the Q value of the acceleration frequency characteristics, the impedance Z, and the average voltage Va as illustrated in FIG. 15. Though the correspondence among the Q value of the acceleration frequency characteristics, the impedance Z, and the average voltage Va when the acceleration amplitude A is defined is three-dimensionally illustrated here, the correspondence among the acceleration amplitude A, the Q value of the acceleration frequency characteristics, the impedance Z, and the average voltage Va only needs to be illustrated in any form.

This correspondence may be a statistical model or a mathematical model. Note that the statistical model or the mathematical model does not need to be precise but may be expressed in an average or approximate manner.

As illustrated in FIG. 15, the correspondence calculator 92 derives the correspondence between the impedance and the voltage at the acceleration amplitude and the Q value, from the acceleration amplitude A, the Q value of the acceleration frequency characteristics, and the correspondence stored in the correspondence storage 91.

According to this embodiment, power can be taken out with high efficiency even when the appropriate impedance Zr changes according to the acceleration amplitude A and the Q value.

(Seventh Embodiment)

Figure 16:
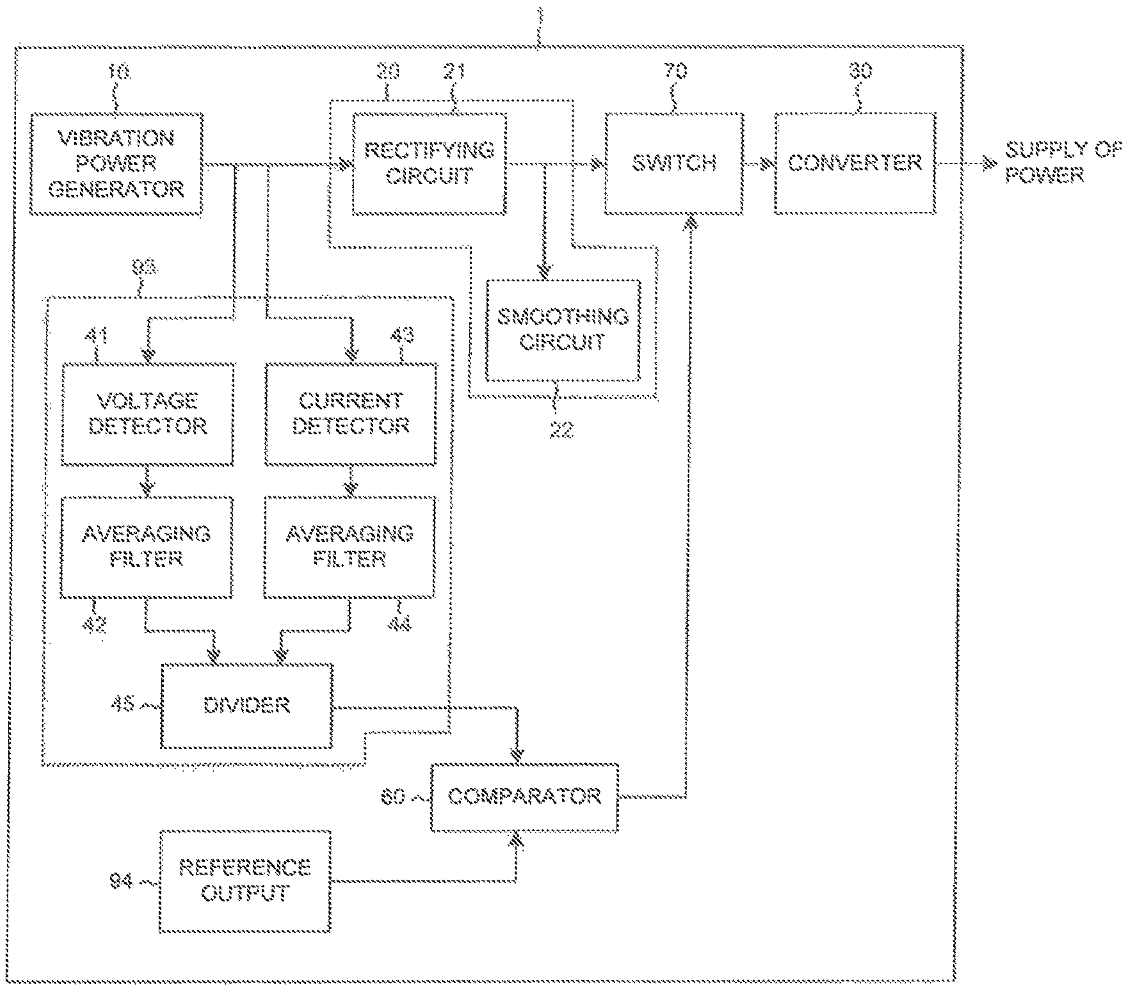
FIG. 16 is a functional block diagram of a vibration power generation system 1 in a seventh embodiment.
Figure 17:
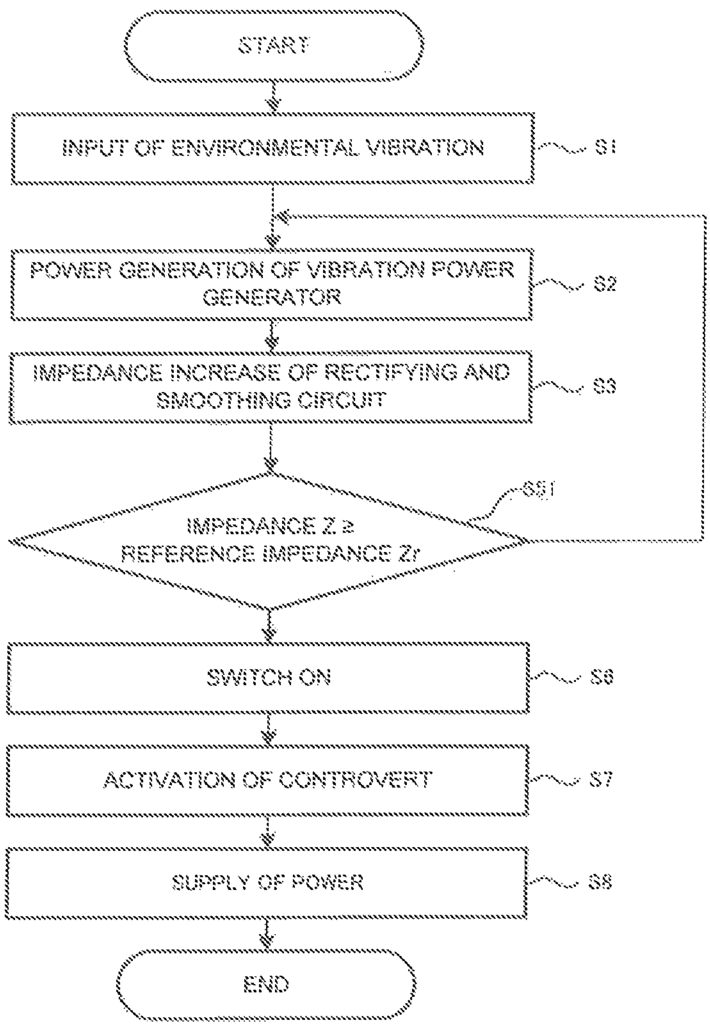
FIG. 17 is a flowchart illustrating an operation procedure of the vibration power generation system 1 in the seventh embodiment.

A seventh embodiment will be explained referring to FIG. 16, FIG. 17. FIG. 16 is a functional block diagram of a vibration power generation system 1 in the seventh embodiment. FIG. 17 is a flowchart illustrating an operation procedure of the vibration power generation system 1 in the seventh embodiment.

As illustrated in FIG. 16, the vibration power generation system 1 includes a vibration power generator 10, a rectifying and smoothing circuit 20, a converter 30, an impedance measurement unit 93, a reference output 94, a comparator 60, and a switch 70.

The impedance measurement unit 93 measures and outputs the impedance Z of the rectifying and smoothing circuit 20.

The impedance measurement unit 93 has a voltage detector 41, an averaging filter 42, a cement detector 43, an averaging filter 44, and a divider 45.

The current detector 43 detects AC current outputted from the vibration power generator 10. More specifically, the current detector 43 outputs the current itself of the AC power outputted from the vibration power generator 10 or a signal indicating its current value.

The averaging filter 44 averages the AC current outputted from the current detector 43 to find its average value (average current Ia). This averaging may be realized by either hardware or software.

The divider 45 divides the average voltage and the average current outputted from the averaging filters 42, 44 respectively to calculate the impedance Z.

Both of the voltage and the current outputted from the vibration power generator 10 are AC. When the AC voltage and the AC current are subjected to division, a section where division by 0 arises, causing a situation undesirable to calculate an average impedance. For this reason, the voltage and the current averaged by the averaging filters 42, 44 are subjected to division.

The reference output 94 outputs a signal corresponding to the reference impedance Zr.

The comparator 60 outputs an output signal when the impedance Z becomes the reference impedance Zr.

The impedance measurement unit 93 in addition to the reference output 51, the comparator 60, the switch 70, and the converter 30 are operated by the smoothed voltage outputted from the rectifying and smoothing circuit 20.

Note that explanation of components in common to the other embodiments will be omitted.

As illustrated in FIG. 17, at the activation time of the vibration power generation system 1, the vibration power generator 10 generates power upon reception of environmental vibration and the impedance Z of the rectifying and smoothing circuit 20 increases (Steps S1 to S3). When the impedance Z becomes the reference impedance Zr or higher, the switch 70 is turned ON (Steps S51, S6). As a result of this, the converter 30 is activated to start power supply to an external load such as a sensor (Steps S7, S8).

In this embodiment, the impedance is directly measured, thereby eliminating the need for the step of calculating the reference voltage Vr.

(Eighth Embodiment)

Figure 18:
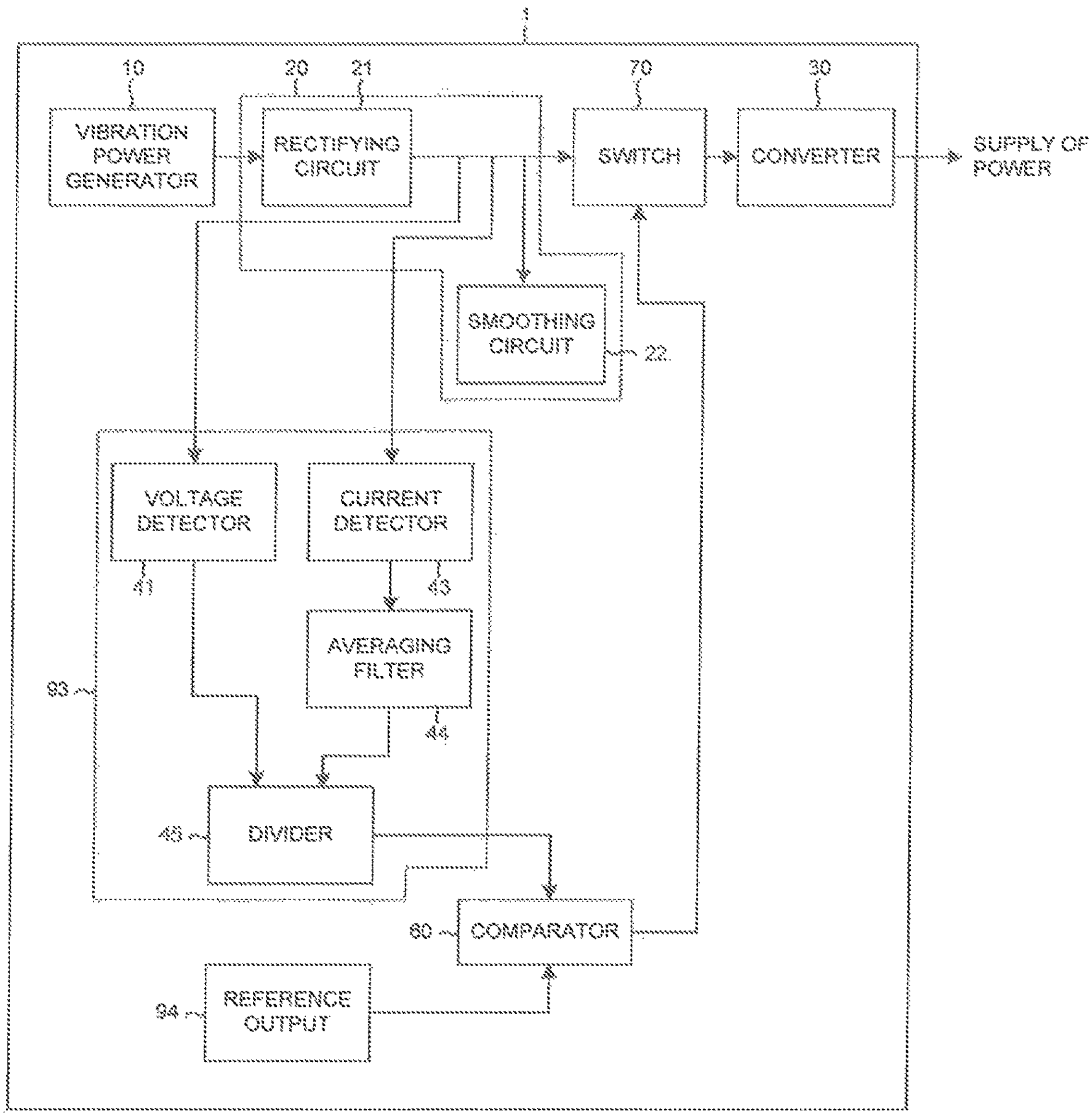
FIG. 18 is a functional block diagram of a vibration power generation system 1 in an eighth embodiment.

An eighth embodiment will be explained. FIG. 18 is a functional block diagram of a vibration power generation system 1 in the eighth embodiment.

This embodiment is different from the seventh embodiment in that the impedance is the one ahead the rectifying and smoothing circuit 20. The other configuration is the same as that in the seventh embodiment.

In this case, the voltage detected by the voltage detector 41 is inputted as it is into the divider 45, whereas the current detected by the current detector 43 is averaged by the averaging filter 44 and then inputted into the divider 45. This is because the voltage detected by the voltage detector 41 is generally smoothed, whereas the current detected by the current detector 43 is still a pulsating current.

As has been described, the DC power of pulsating current is outputted from the rectifier circuit 21. Both of the voltage and the current of the power outputted in this case are pulsating current. The smoothing circuit 29 stores electric charges until the voltage rises to a certain level, and thereby smooths the voltage of pulsating current (the voltage of the rectifying and smoothing circuit 20 is decided by the electric charges stored in the smoothing circuit 29). On the other hand, the smoothing circuit 29 less smooths the current than the voltage.

(Ninth Embodiment)

Figure 19:
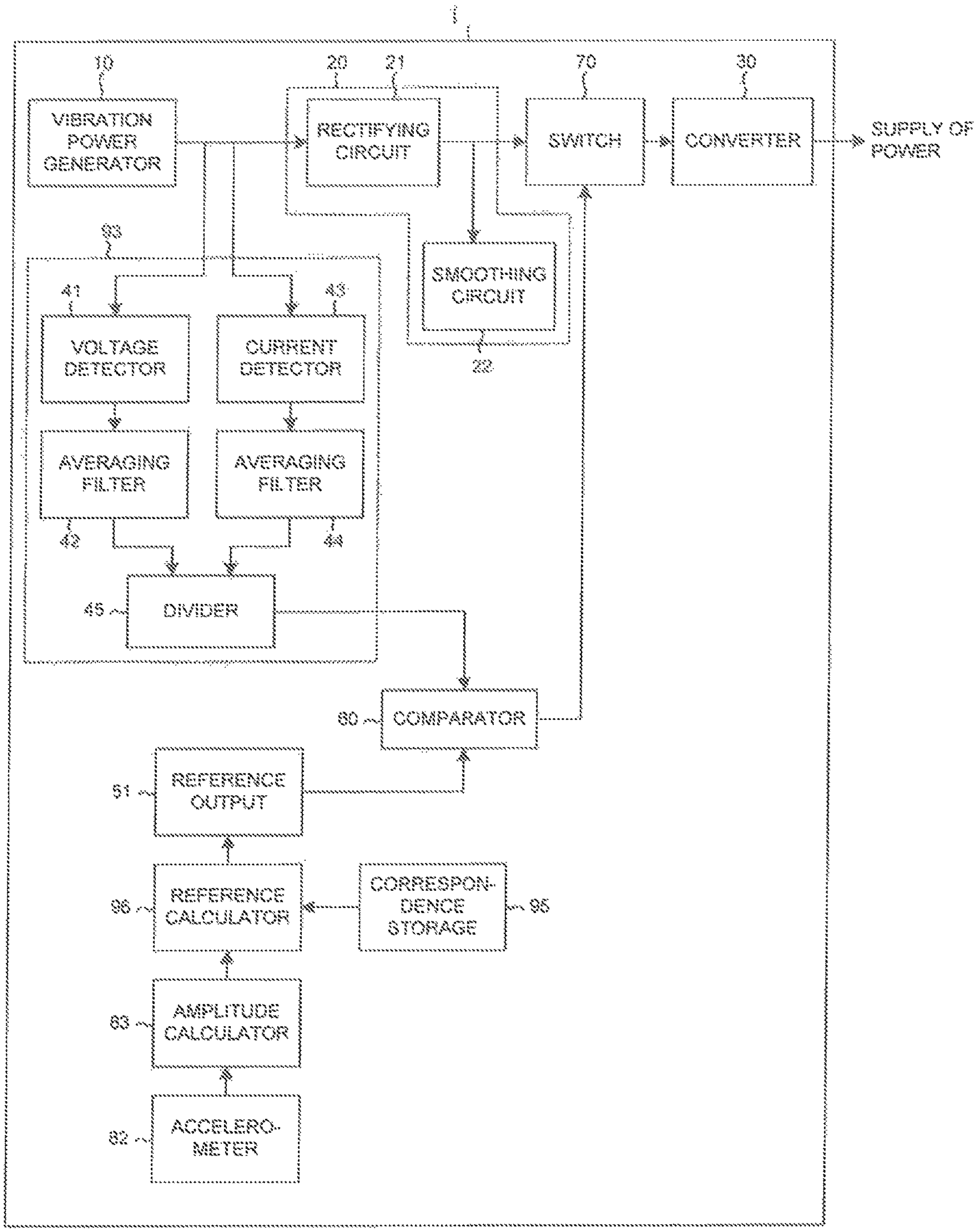
FIG. 19 is a functional block diagram of a vibration power generation system 1 in a ninth embodiment.

A ninth embodiment will be explained. FIG. 19 is a functional block diagram of a vibration power generation system 1 in the ninth embodiment.

The ninth embodiment is different from the seventh embodiment in that an accelerometer 82, an amplitude calculator 83, a correspondence storage 95, and a reference calculator 96 are further provided. The other configuration is the same as that in the seventh embodiment.

The correspondence storage 95 stores the correspondence between an acceleration amplitude A and an appropriate impedance Zr.

The reference calculator 96 calculates die reference impedance Zr on the basis of the correspondence between the acceleration amplitude A and the appropriate impedance Zr from the correspondence storage 53 and the acceleration amplitude A from the amplitude calculator 83.

The other configuration is the same as that in the fourth embodiment, and explanation thereof will be omitted.

According to this embodiment, power can be taken out with high efficiency even when the appropriate impedance Zr changes according to the acceleration amplitude A.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power generation system comprising:

a power generator that outputs AC power;

a rectifying and smoothing circuit that converts the AC power to DC power, and smooths the DC power;

a voltage measurement unit that measures an average voltage of the AC power or a voltage of the smoothed DC power;

a converter that transforms the smoothed DC power;

a switch that is disposed between the rectifying and smoothing circuit and the converter, and becomes an ON state when the measured average voltage of the AC power or the measured voltage of the smoothed DC power becomes a reference voltage or higher than the reference voltage;

a storage that stores a correspondence between an impedance of the rectifying and smoothing circuit and the average voltage of the AC power or the voltage of the smoothed DC power;

a setting unit that sets a predetermined impedance; and a calculator that calculates the reference voltage from the predetermined impedance and the correspondence.

2. A power generation system comprising:

a power generator that outputs AC power;

a rectifying and smoothing circuit that converts the AC power to DC power, and smooths the DC power;

a voltage measurement unit that measures an average voltage of the AC power or a voltage of the smoothed DC power;

a converter that transforms the smoothed DC power;

a switch that is disposed between the rectifying and smoothing circuit and the converter, and becomes an ON state when the measured average voltage of the AC power or the measured voltage of the smoothed DC power becomes a reference voltage or higher than the reference voltage;

an accelerometer that measures acceleration of the power generation system;

a first calculator that calculates an amplitude of the measured acceleration;

a storage that stores a first correspondence among the amplitude of the acceleration, an impedance of the rectifying and smoothing circuit, and the average voltage of the AC power or the voltage of the smoothed DC power;

a setting unit that sets a predetermined impedance;

a second calculator that derives a second correspondence between the impedance of the rectifying and smoothing circuit and the average voltage of the AC power or the voltage of the smoothed DC power from the calculated amplitude of the acceleration and the first correspondence; and a third calculator that calculates the reference voltage from the predetermined impedance and the second correspondence.

3. A power generation system comprising:

a power generator that outputs AC power;

a rectifying and smoothing circuit that converts the AC power to DC power, and smooths the DC power;

a voltage measurement unit that measures an average voltage of the AC power or a voltage of the smoothed DC power;

a converter that transforms the smoothed DC power;

a switch that is disposed between the rectifying and smoothing circuit and the converter, and becomes an ON state when the measured average voltage of the AC power or the measured voltage of the smoothed DC power becomes a reference voltage or higher than the reference voltage;

an accelerometer that measures acceleration of the power generation system;

a first calculator that calculates an amplitude of the measured acceleration;

a second calculator that calculates a Q value of frequency characteristics of the measured acceleration;

a first storage that stores a first correspondence among the amplitude of the acceleration, an impedance of the rectifying and smoothing circuit, and the average voltage of the AC power or the voltage of the smoothed DC power;

a second storage that stores a third correspondence between the Q value of the frequency characteristics of the acceleration and an appropriate impedance of the power generator;

a third calculator that derives a second correspondence between the impedance of the rectifying and smoothing circuit and the average voltage of the AC power or the voltage of the smoothed DC power from the calculated amplitude of the acceleration and the first correspondence; and a fourth calculator that calculates a reference impedance from the calculated Q value and the third correspondence; and a fifth calculator that calculates the reference voltage from the reference impedance and the second correspondence.

4. A power generation system comprising:

a power generator that outputs AC power;

a rectifying and smoothing circuit that converts the AC power to DC power, and smooths the DC power;

a voltage measurement unit that measures an average voltage of the AC power or a voltage of the smoothed DC power;

a converter that transforms the smoothed DC power;

a switch that is disposed between the rectifying and smoothing circuit and the converter, and becomes an ON state when the measured average voltage of the AC power or the measured voltage of the smoothed DC power becomes a reference voltage or higher than the reference voltage;

an accelerometer that measures acceleration of the power generation system;

a first calculator that calculates an amplitude of the measured acceleration;

a second calculator that calculates a Q value of frequency characteristics of the measured acceleration;

a first storage that stores a first correspondence among the Q value of the frequency characteristics of the acceleration and an appropriate impedance of the power generator;

a second storage that stores a second correspondence among the amplitude of the acceleration, the Q value of the frequency characteristics of the acceleration, an impedance of the rectifying and smoothing circuit, and the average voltage of the AC power or the voltage of the smoothed DC power;

a third calculator that calculates a reference impedance from the calculated Q value and the first correspondence;

a fourth calculator that derives a second correspondence between the impedance of the rectifying and smoothing circuit and the average voltage of the AC power or the voltage of the smoothed DC power from the calculated amplitude of the acceleration, the calculated Q value, and the second correspondence; and a fifth calculator that calculates the reference voltage from the reference impedance and the second correspondence.

5. A power generation system comprising:

a power generator that outputs AC power;

a rectifying and smoothing circuit comprising a rectifier circuit that converts the AC power to DC power and a smoothing circuit that smooths the DC power;

a converter that transforms the smoothed DC power;

a voltage detector that detects AC voltage outputted from the power generator;

a current detector that detects AC current outputted from the power generator;

a first averaging filter that averages the AC voltage detected by the voltage detector to output average voltage;

a second averaging filter that averages the AC current detected by the current detector to output average current;

a divider that divides the average voltage by the average current to calculate an impedance; and a switch that is disposed between the rectifying and smoothing circuit and the converter and becomes an ON state when the impedance becomes a reference impedance or higher than the reference impedance.

6. A power generation system comprising:
a power generator that outputs AC power;
a rectifying and smoothing circuit comprising a rectifier circuit that converts the AC power to DC power and a smoothing circuit that smooths the DC power;
a converter that transforms the smoothed DC power;
an impedance measurement unit that measures an impedance of the rectifying and smoothing circuit or the smoothing circuit;
a switch that is disposed between the rectifying and smoothing circuit and the converter and becomes an ON state when the measured impedance becomes a reference impedance or higher than the reference impedance;
an accelerometer that measures acceleration of the power generation system;
a first calculator that calculates an amplitude of the measured acceleration;
a storage that stores a correspondence between the amplitude of the acceleration and an impedance; and
a second calculator that calculates the reference impedance from the calculated amplitude of the acceleration and the correspondence.

* * * * *